Oct. 31, 1961   M. J. VITOL ET AL   3,006,322
ANIMAL COLLAR
Filed March 27, 1959
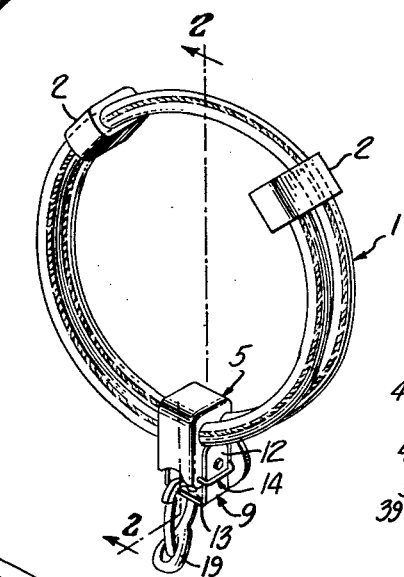
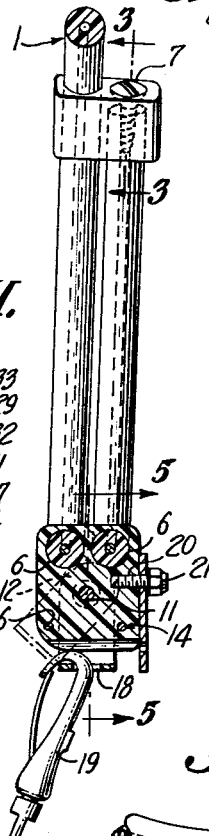
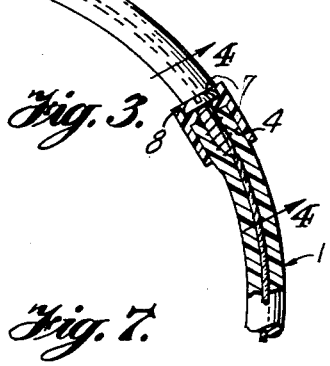
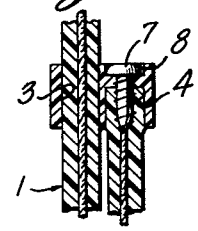
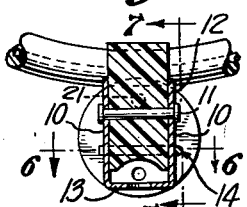
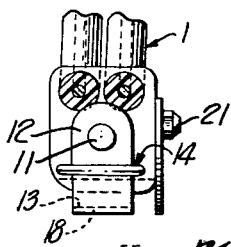
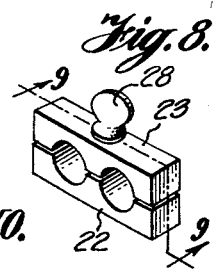
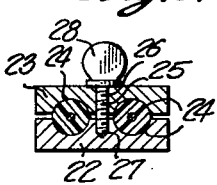
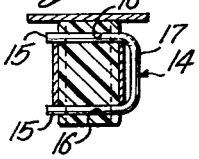
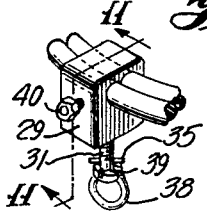
INVENTORS
Matt J. Vitol and
Owen P. Bricker, III
BY Mason, Fenwick & Lawrence
ATTORNEYS

United States Patent Office
3,006,322
Patented Oct. 31, 1961

3,006,322
ANIMAL COLLAR
Matt J. Vitol, Woodstock, Va., and Owen P. Bricker III, Lancaster, Pa., assignors of seventy-five percent to said Vitol and twenty-five percent to said Bricker
Filed Mar. 27, 1959, Ser. No. 802,409
11 Claims. (Cl. 119—106)

This invention relates to animal collars generally and to such collars particularly adapted for use with dogs.

In the past, collars used for small animals such as dogs have been either the strap type or of chain. The strap type employs buckles or laces to secure the ends, and the chain collars are fastened by opening and closing a link or by slipping one end through a ring carried by the other end of the chain. With both types, dealers are required to carry assorted sizes due to the limited range of adjustment which may be provided within practical limits. Dog owners must buy several as a dog grows, for one which will fit a puppy will not fit a full grown dog. Chain type collars cut into a dog's neck if the dog strains on the leash. Leather strap-type collars, on the other hand, are so wide as to be unsightly, particularly on small dogs or long-haired dogs. In addition, it is impossible to keep them clean, sanitary and odorless.

The general object of the present invention is to provide an improved animal collar which will adjust to fit animals having a wide range of neck sizes.

Another object is the provision of a collar of this type which has novel adjusting means which may be quickly released or locked and, when locked, will be positively held in position.

Still another object is the provision of a collar capable of adjustment over a wide range, yet having no free ends to hang loose irrespective of the size to which the collar is adjusted.

A further object is to provide a collar of such construction and materials that it will be quite sanitary, and can be washed or otherwise cleaned when desired.

Yet another object is the provision of an improved collar which, due to being unstitched and imperforate and having novel end fastenings will have unusual strength and be substantially sealed against moisture.

It is also an object to provide a collar of this nature which will have little surface contact with the neck of the animal, and, therefore, will slide easily on the neck and remain properly oriented.

Another object is to provide a collar in which the locking means will contain provision for connection of a leash, yet the connection of a leash will not interfere with the efficiency of the lock or tend to release it.

A further object is the provision of a collar having improved means for securing license, identification, or other tags to the collar.

Other objects of the invention will become apparent from the following description of practical embodiments thereof when taken in conjunction with the drawings which accompany and form part of this specification.

In the drawings:

FIGURE 1 is a perspective view of a collar made in accordance with the principles of the present invention;

FIGURE 2 is a vertical section through the collar taken on the line 2—2 of FIGURE 1;

FIGURE 3 is a section through one end of the collar forming element, and is taken on the line 3—3 of FIGURE 2;

FIGURE 4 is a transverse section taken on the line 4—4 of FIGURE 3;

FIGURE 5 is a section through the locking slide, taken on the line 5—5 of FIGURE 2;

FIGURE 6 is a section taken at right angles to FIGURE 5 and substantially on the line 6—6 of FIGURE 5;

FIGURE 7 is a section taken on the line 7—7 of FIGURE 5;

FIGURE 8 is a perspective view of a modified type of locking slide;

FIGURE 9 is a section through the slide shown in FIGURE 8 and is taken on the line 9—9;

FIGURE 10 is a perspective view of still another form of locking slide; and

FIGURE 11 is a section taken on the line 11—11 of FIGURE 10.

In general, the invention relates to an animal collar made from a single length of cable, or other suitable material, with its ends overlapping and held in end slides mounted on the cable. A locking slide is mounted on the overlapping portions of the cable and serves to lock the collar in desired positions of adjustment.

Referring to the drawings in detail, there is shown an animal collar composed of a length of cable 1. This cable may be of any conventional type having the requisite strength, and the type shown is a twisted wire cable covered with a suitable plastic to provide a smooth surface which will not gall the neck of an animal. Although a cable having circular cross-section is shown and described herein, it will be understood that other materials and other shapes may be used as desired. The length of the cable is slightly more than sufficient to encircle the neck of the largest dog on which the collar is to be used.

Onto this cable are placed two end slides 2, the cable sliding freely through openings 3 in the slides. Each end slide is provided with a recess 4 parallel to, but spaced from, the opening 3 to receive the end of the cable which has been passed through the opposing end slide. The ends of the cable are suitably anchored in the recesses 4, as will be described. This arrangement provides a complete loop of cable with the overlapping ends anchored in the end slides 2. This permits the end slides to be moved along the cable to increase, or decrease, the distance between them and thus increase, or decrease, the overlap of the cable ends, and consequently the loop size. In this manner, the loop can be adjusted to the precise diameter desired. This arrangement provides for approximately doubling the circumference of the loop in expanding from minimum to maximum size.

In order to hold the end slides in desired positions of adjustment on the cable, a locking slide 5 is provided which has two parallel through openings 6 through which the overlapped ends of the cable pass. This places the locking slide intermediate the end slides 2. Means are provided for fixing the locking slide immovably on the cable so that the collar can be held in adjusted positions. Thus, a collar is provided which can be adjusted for size by moving the end slides relative to one another, and which may be held in adjusted positions by causing the locking slide to become fixed to the cable so that the overlapped cable ends become immovable.

End slides 2 may be formed of any suitable material, such as a shape-retaining plastic. It has been found that an excellent attachment of the cable end to the end slides can be obtained by stretching and elongating the end of the plastic cover of the cable to pull it beyond the end of the wire core and leave a central opening axially of the cable end. When the cable end is inserted in the recess 4, a screw 7 is inserted in a counter-sunk opening 8 provided in the end slide coaxial to the recess 4, and threaded into the central end opening in the cable. The entrance of the screw into the cable end will cause the cable to bulge so that the end will be swelled into binding contact with the walls of the recess 4. This not only forms an extremely tight clamping of the cable and end slide, but also seals the cable end to keep moisture from getting into the cable.

The locking slide 5 has its openings 6 positioned near its top so that little of the slide will project into the inside of the collar loop. The openings are proportioned so that the slide will be freely movable along the overlapped cable lengths. In order to fix the locking slide to the cable, a retainer 9 is used. This may take the form of a U-shaped member having its arms 10 lying along opposite faces of the slide and connected to the slide by pivot pin 11. The arms of the retainer have arcuate ends 12 and the pivot pin is located such distance from the end of the retainer that the arcuate ends 12 will have a cam action to bear against the cable lengths at opposite edges of the locking slide. In actual practice, the ends of the retainer arms will depress the cable to form a positive lock. The bridge member 13 of the retainer will serve as a connector for the arms and as an operating handle for the retainer in moving it to locking and unlocking positions. A U-shaped clip 14 may be used to hold the retainer in its upright, locked position. The legs 15 of the clip will be spaced apart just enough to span the width of the arms of the retainer and will be inserted in holes 16 in the block. The legs of the clip will extend beyond the opposite side of the block so that both of the arms of the retainer will be embraced and the retainer held against movement. The bridge bar 17 of the clip will be bowed, or otherwise spaced from the retainer arm to which it is adjacent when the clip is in place, so that it may be withdrawn by inserting the fingernail between the bridge bar 17 and the retainer arm. After the clip is removed, the retainer may be rocked to remove its edge from contact with the cable and permit the slide to move freely along the cable.

The bridge member 13 of the retainer may be provided with an opening 18 into which the snap 19 of a leash may be coupled.

The locking slide may also be provided with a threaded opening 20 to receive a screw 21. The screw will form a convenient means for attaching tags to the collar and one by which tags of all types may be attached and removed without the use of complicated tools.

It will be readily apparent that the collar just described will have many advantages. It will be neat appearing, extremely easy to keep clean due to the construction and materials used, may be adjusted quickly and easily and over a wide range so that one collar will fit during the full growth period of an animal, and has means for the ready attachment of tags of types and sizes. The smooth material of the collar, plus the fact that the locking slide provides the concentration of weight will ensure the collar sliding freely on the animal's neck to remain properly oriented with the locking slide at the center of the throat.

In FIGURES 8 and 9, there is shown a modified locking slide. This slide is in two parts, a lower half 22 and an upper half 23, each half having two arcuate recesses 24 which serve to embrace the overlapping section of the cable of the collar. The recesses are shallow enough so that the halves of the slide are held spaced apart when the cable lengths are in the recesses, and a clamping screw 25 is used to bind the halves upon the cable. The screw fits through an opening 26 in the upper half of the slide and screws into a threaded socket 27 in the lower half. Screw 25 is provided with a flat head 28 which can be grasped between the thumb and forefinger for easy operation. When the screw is loosened, the slide can be moved on the cable, or the cable drawn through the slide. When the screw is tightened, the slide will be firmly locked to the cable.

FIGURES 10 and 11 show a further modification of the locking slide, and one which now appears to be preferred over the two previously described. Here, the slide 29 is again a solid block having cable-receiving openings 30 through which the cable lengths are freely slidable. In this form of the invention, the slide is fixed to the cable by means of a locking screw 31 which screws into a threaded opening 32 in the block. Opening 32 is positioned centrally of the block and enters the block from the bottom. The opening, or recess, passes between, and intersects, the cable openings 30 so that the side portions of the cable lengths in openings 30 lie within the screw socket, or recess, 32. Screw 31 has a tapered leading end 33 which pases between the exposed cable lengths, contacts them, and serves to wedge the cable portions against the opposite sides of openings 30 and frictionally lock the cable within the slide.

Screw 31 is provided with a head 34, and spaced upwardly from the head a pin 35 traverses the screw to project beyond it on both sides. In between the head and pin, there is an operating member 36 which includes a collar 27 freely rotatable and slidable on the shank of the screw. The collar carries a ring 38 which serves as a finger piece for the operating member in controlling the lock, and as a loop into which a leash may be snapped. The upper side of the collar, that is the side adjacent pin 35, is provided with diametrically aligned grooves 39 to receive the projecting ends of pin 35 when the collar is moved along the shank of the screw away from the screw head. When the pin seats in the grooves, the screw may be rotated by rotation of the operating member to tighten and loosen the engagement of the screw with the cable. When the rotation of the screw is completed and the operating member released, the collar will drop down against the head 34 so that the pin is no longer seated in the grooves, and the operating member is then freely swivelled on the screw. It will be noted that when a leash is coupled to ring 38 and an animal pulls against the collar, the operating member will be held tightly against the screw head 34 and there will be no likelihood of engagement of the pin in the grooves in the collar.

The slide may have a screw 40 threaded into an opening 41 in the side of the block for mounting tags in a manner similar to that described in the first form of locking slide.

While in the above practical embodiments of the invention have been disclosed, it will be understood that the details of construction shown and described are merely by way of example and the invention may take other forms within the scope of the appended claims.

What is claimed is:

1. An animal collar comprising, a length of material to encircle the neck of an animal, a pair of end slides threaded on the material and freely slidable therealong, the material having ends projecting beyond the end slides and being overlapped and secured in opposed end slides so that the material forms a loop and movement of the end slides along the material will vary the length of the overlapped ends and thus the circumference of the loop, a locking slide having a pair of parallel openings therethrough through which the overlapped ends of the material pass, whereby the locking slide is slidable on the overlapped ends of the material intermediate the end slides, and means carried by the locking slide to clamp the locking slide to the overlapped ends of the material.

2. An animal collar as claimed in claim 1 wherein the locking slide is made in two parts with portions of the locking slide openings being in each part of the locking slide, and the clamping means comprises a screw threadedly engaging the locking slide parts to draw them into engagement with the overlapped material ends.

3. An animal collar as claimed in claim 1 wherein the means to clamp the locking slide to the material comprises a cam latch pivotally attached to the locking slide for movement into engagement with the material in the openings of the locking slide to press the material into clamping engagement with the locking slide opening walls.

4. An animal collar as claimed in claim 3 wherein the locking slide has a pair of clip openings one on each side of the cam latch when in clamping position, and a clip having a pair of legs for insertion into the clip openings to embrace the cam latch and prevent movement of the latch to release position.

5. An animal collar as claimed in claim 1 wherein the locking slide has a threaded recess therein passing between and intersecting the openings through which the overlapped material ends pass, and a screw in the recess for wedging engagement with the material ends.

6. An animal collar as claimed in claim 5 wherein the screw has an operating member swivelly mounted thereon and said screw and operating member having mating clutch elements by which the operating element may be fixed to the screw for rotation of the screw.

7. An animal collar as claimed in claim 1 wherein the means to clamp the locking slide to the overlapped ends comprises, the locking slide having a threaded recess therein passing between and intersecting the openings in the locking slide through which the overlapped material ends pass, a screw in the recess for wedging engagement with the material ends, the screw having a portion extending outwardly from the locking slide and having a clutch element thereon, a leash coupling ring swivelly mounted on the projecting portion of the screw and having a mating clutch element thereon operable when the ring is moved toward the locking slide to engage the clutch element on the screw to couple the ring to the screw so that rotation of the ring will cause rotation of the screw.

8. An animal collar comprising, a length of material arranged in a loop to encircle the neck of an animal and having first and second ends in overlapping relation, first and second slides, each slide having an opening therethrough and a recess therein, the first end of the material being slidably threaded through the opening in the first slide and fixed in the recess in the second slide, the second end of the material being slidably threaded through the opening in the second slide and fixed in the recess in the first slide, a locking slide threaded on the overlapping first and second ends of the material intermediate the first and second slides and freely slidable therealong, and means carried by the locking slide to clamp the ends of the material threaded through the locking slide to the locking slide to prevent movement of the ends of the material relative to the locking slide and to each other.

9. An animal collar as claimed in claim 8 wherein the ends of the material are fixed in the recesses of the first and second slides by means of screws threaded into the ends of the material swelling the material and binding the ends in the recesses.

10. An animal collar as claimed in claim 8 wherein the locking slide has at least one opening through which the ends of the material are threaded, and the means to clamp the ends of the material to the locking slide includes a member screw threaded in the locking slide and having an end portion movable between the ends of the material to wedge the end of the material against the sides of the passage through which the ends of the material pass.

11. An animal collar as claimed in claim 10, a leash coupling ring swivelly mounted on screw threaded member, and means for coupling the ring to the screw threaded member upon movement of the ring toward the locking slide so that rotation of the ring will cause rotation of the screw threaded member and for releasing the ring for free swivelling movement upon the screw threaded member upon movement of the ring away from the locking slide.

References Cited in the file of this patent
UNITED STATES PATENTS

| | | |
|---|---|---|
| 1,618,433 | Hubbard | Feb. 22, 1927 |
| 2,798,458 | Odermatt | July 9, 1957 |